(12) United States Patent
Dominique et al.

(10) Patent No.: US 7,266,723 B2
(45) Date of Patent: Sep. 4, 2007

(54) METHOD AND APPARATUS FOR CONTROLLING UPLINK POWER TO MAINTAIN DESIRED FRAME ERROR RATE IN A WIRELESS COMMUNICATIONS SYSTEM

(75) Inventors: Francis Dominique, Rockaway, NJ (US); Hongwei Kong, Denville, NJ (US); Henry Hui Ye, Ledgewood, NJ (US); Jialin Zou, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 476 days.

(21) Appl. No.: 10/798,166

(22) Filed: Mar. 11, 2004

(65) Prior Publication Data

US 2005/0204192 A1    Sep. 15, 2005

(51) Int. Cl.
*G06F 11/00* (2006.01)
(52) U.S. Cl. .......................... 714/18; 714/52; 714/708; 714/712; 714/715
(58) Field of Classification Search .................. 714/18, 714/52, 712, 715, 708
See application file for complete search history.

(56) References Cited

U.S. PATENT DOCUMENTS 6,963,753 B1 * 11/2005 Hamabe ..................... 455/522

2001/0010684 A1 * 8/2001 Willenegger et al. ....... 370/311
2002/0085502 A1 * 7/2002 Chheda et al. .............. 370/252

FOREIGN PATENT DOCUMENTS

| EP | 893 889 | 1/1999 |
|---|---|---|
| EP | 1 501 208 | 1/2005 |
| WO | WO99/12275 | 3/1999 |

OTHER PUBLICATIONS

European Search Report, Appl. No. 05251293.6-2411 PCT/, (Jul. 20, 2005).

* cited by examiner

*Primary Examiner*—Robert Beausoliel
*Assistant Examiner*—Charles Ehne

(57) ABSTRACT

In the absence of a continuous channel from the mobile terminal that incorporates a CRC in each transmitted frame from which the base station can derive a power control signal for feedback to the mobile station for maintaining the mobile station's pilot $E_b/N_0$ level at a desired target that corresponds to a particular frame error rate, the pilot signal received by the base station from the mobile terminal itself is arranged in a frame format. Each pilot frame is compared with an a prioi known transmitted pilot signal bit pattern to determine whether it has been received in error. In response to a comparison of a received pilot frame with the expected known bit pattern of the pilot frame, an error signal is derived, which in the described embodiment is either a step-up or step-down signal that is fed back to the mobile terminal to increase or decrease its transmitted pilot $E_b/N_0$ level, respectively.

5 Claims, 4 Drawing Sheets

METHOD AND APPARATUS FOR CONTROLLING UPLINK POWER TO MAINTAIN DESIRED FRAME ERROR RATE IN A WIRELESS COMMUNICATIONS SYSTEM

TECHNICAL FIELD

This invention relates to wireless communications, and, more particularly, to controlling uplink power in a wireless communications system.

BACKGROUND OF THE INVENTION

In prior art CDMA wireless communication systems that only support voice communications, shown illustratively in FIG. 1, a mobile terminal 101 transmits an encoded voice signal and a pilot signal in a digital form over a propagation channel 102 to a base station receiver 103. The analog voice signal is encoded and transmitted by the mobile terminal 101 on a Fundamental Channel (FCH) 104 in a fixed frame format that incorporates a Cyclic Redundancy Code (CRC) in each frame. The pilot signal, consisting of a fixed bit pattern, is transmitted on a Pilot Channel (PICH) 105. The FCH and PICH are code-division multiplexed (CDM) and kept orthogonal through the use of different Walsh codes. At the base station receiver 103, the pilot signal is used for the detection of the FCH. Also, at the mobile terminal 101, a fixed relationship is maintained between the power level of the pilot signal, referred to as the pilot $E_b/N_0$ level, and the power level of the FCH. At the receiver, after the FCH and pilot signal are demultiplexed from the received CDM signal, a channel estimator 106 operates on the demultiplexed pilot signal and is used by the FCH detector/decoder 110 to derive the frame-formatted bit stream representing the frame-formatted encoded voice signal transmitted by the mobile terminal on the FCH channel in a manner well known in the art. Using the CRC in a received frame, a CRC checker 107 compares the received frame and the CRC in the received frame to determine whether or not the frame has been received in error. A mobile target $E_b/N_0$ setup device 108 then derives a step-up or step-down signal in response to the comparison, which is transmitted by the base station 102 on the downlink channel 109 to the mobile terminal 101. If the frame passes its CRC check, the base station 103 transmits a step-down signal to the mobile terminal 101 to reduce the pilot signal $E_b/N_0$ level and concomitant with that the power level of the transmitted FCH. This mitigates continued transmission by the mobile terminal at a power level could be high enough to be causing interference with other mobile terminals. If the received frame fails its CRC check, the base station transmits a step-up signal to the mobile terminal to increase its pilot signal $E_b/N_0$ level and thus also the power level of the transmitted FCH. This mitigates continued transmission by the mobile terminal at a power level that is too low for accurate detection by the base station.

FIG. 2 shows the relationship between the FCH Frame Error Rate (FER) and the pilot $E_b/N_0$ level of the mobile terminal 101. In order to achieve a particular FER, the $E_b/N_0$ level of the mobile terminal should be at the level that corresponds with that particular FER. To achieve an overall desired FER of X, a step-up size, step_up, equal to $$\left(\frac{1}{FER} - 1\right) \times \text{step\_down}$$

is used, where step_down is equal to X $\Delta$ dB. For example, for a typical FER of $10^{-2}$, the step_up is set at 99×step_down. $\Delta$ is typically a value between 0.3 and 1. Thus, in order to achieve an FER of $10^{-2}$, a typical step-down size of between 0.003 dB and 0.01 dB is used, with a corresponding step-up size of approximately between 0.3 and 1.0 dB.

In CDMA2000 systems, in addition to the FCH and PICH channels, which are code-division-multiplexed together for transmission from the mobile terminal to the base station, the mobile terminal code-division multiplexes a Dedicated Control Channel (DCCH) that is used for transmitting control data, a Supplemental Channel (SCH) that is used for transmitting packet data, a Channel Quality Indicator Channel (CQICH) that is used for indicating downlink received pilot strength, and an Acknowledgement Channel (ACKCH) that is used for indicating to the base station whether a received data packet on the downlink has been successfully decoded. The latter two channels are used to support downlink high-speed data transmission, with the ACKCH being muted when the mobile terminal is not receiving any data on the downlink. When packet data is being transmitted on the SCH or DCCH by the mobile terminal, the FCH is not transmitted to conserve power since maintaining it in a NULL state is wasteful of the mobile terminal's power resources. The FCH is thus not always available from which a feedback signal for controlling the mobile terminal's pilot $E_b/N_0$ level. The SCH and DCCH, which do use a CRC are discontinuous channels that are only active when data is being transmitted on them and thus also are not always available to derive a feedback signal for controlling the mobile terminal's pilot $E_b/N_0$ level. The ACKCH, which is not coded, does not therefore use a CRC. The CQICH, which is coded, doesn't use a CRC. Thus, with a discontinuous FCH, and discontinuous DCCH and SCH, no mechanism is available for continuously adjusting the mobile terminal's pilot $E_b/N_0$ level up or down in response to a comparison of a received frame and its associated CRC in order to achieve a desired overall frame error rate on the FCH. Since all the channel levels transmitted by the mobile terminal are referenced to the pilot $E_b/N_0$ level, a mechanism is needed, therefore, to set up and maintain the pilot $E_b/N_0$ level so that a desired frame error rate for the referenced FCH is achieved at the base station and the other channels are maintained at their corresponding appropriate levels.

SUMMARY OF THE INVENTION

In the absence of a continuous channel from the mobile terminal that incorporates a CRC in each transmitted frame from which the base station can derive a power control signal for feedback to the mobile station for maintaining the mobile station's pilot $E_b/N_0$ level at a desired target that corresponds to a particular frame error rate, the pilot signal received by the base station from the mobile terminal itself is used to derive an error signal which serves as a feedback power control signal. In an embodiment of the present invention, a fixed-sized frame structure is imposed on the continuously received digital pilot signal bit stream. Each pilot frame is then compared with an a prioi known transmitted pilot signal bit pattern to determine whether it has been received in error. In response to a comparison of a received pilot frame with the expected known bit pattern of the pilot frame, an error signal is derived, which in the described embodiment is either a step-up or step-down signal that is fed back to the mobile terminal to increase or decrease its transmitted pilot $E_b/N_0$ level, respectively. The mobile terminal then increases or deceases its pilot $E_b/N_0$ level by a step-up step size or step-down step size, respectively, that is dependent on a frame error rate for the pilot frames that has been determined to be equivalent to a particular desired FCH frame error rate. The length of the pilot frame that is used for comparison with the known pilot signal pattern is one in which for that particular FCH frame error rate and its corresponding target pilot $E_b/N_0$ level, the frame error rate of the pilot frames for that same target $E_b/N_0$ level remains at a constant value regardless of the particular installation scenario between the mobile terminal and the base station (i.e., the channel conditions, the distance between mobile terminal and base station, etc.). Thus, by maintaining the frame error rate of the pilot frames at that constant value, the pilot $E_b/N_0$ level is maintained at the target level that corresponds to the desired fixed frame error rate on the FCH. Thus, whenever the mobile terminal transmits the FCH, it is transmitted at a power level such that the received signal by the base station has the desired frame error rate. Further, all the other channels, which power level are controlled relative to the pilot $E_b/N_0$ level, are continuously maintained at their proper power levels when they are transmitted regardless of whether or not the FCH is being transmitted.

The error signal derived by the base station from a comparison of each pilot frame with the a priori known frame pattern can also be used as a measure of uplink signal quality and can be used by the base station as a factor in determining whether communication between the base station and the mobile terminal should be continued or should be discontinued.

BRIEF DESCRIPTION OF THE DRAWING

The present invention will be better understood from reading the following description of non-limiting embodiments, with reference to the attached drawings, wherein below.

DETAILED DESCRIPTION

Figure 1:
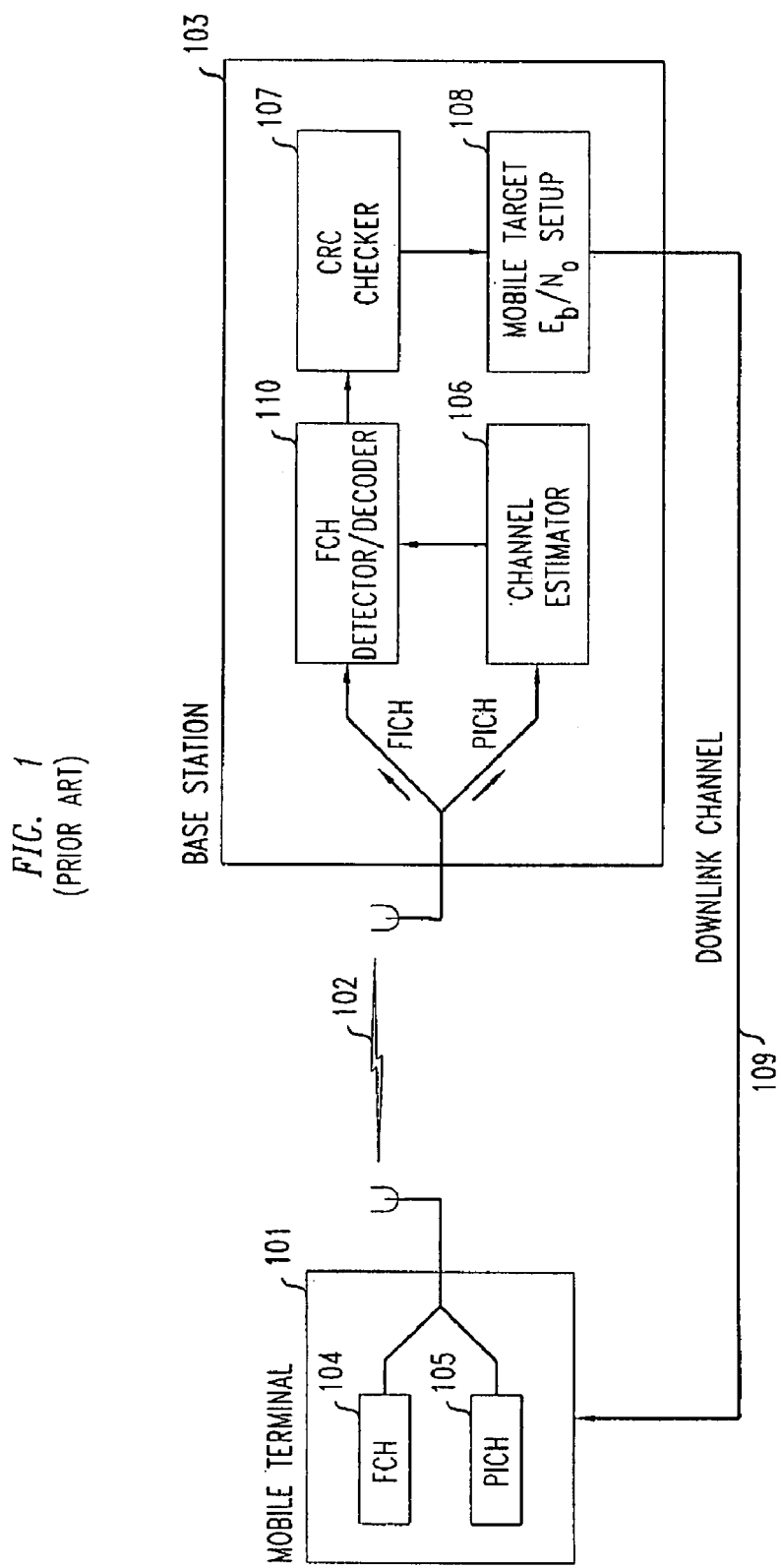
FIG. 1 is a prior art wireless communications system in which a CRC incorporated within an FCH is used to derive a feedback signal to a mobile terminal for controlling a pilot $E_b/N_0$ level in order to achieve a desired frame error rate.
Figure 2:
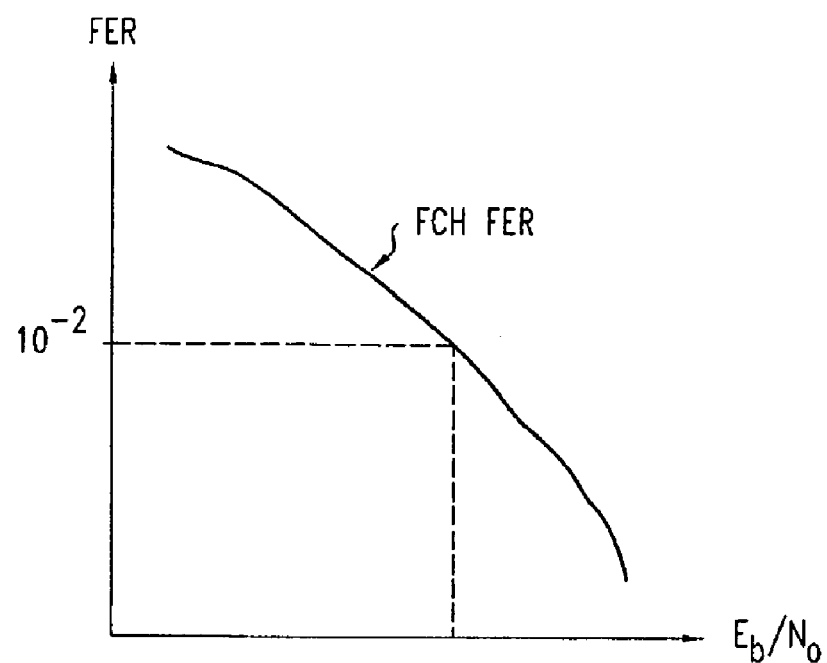
FIG. 2 shows the relationship between the pilot $E_b/N_0$ level and frame error rate.
Figure 3:
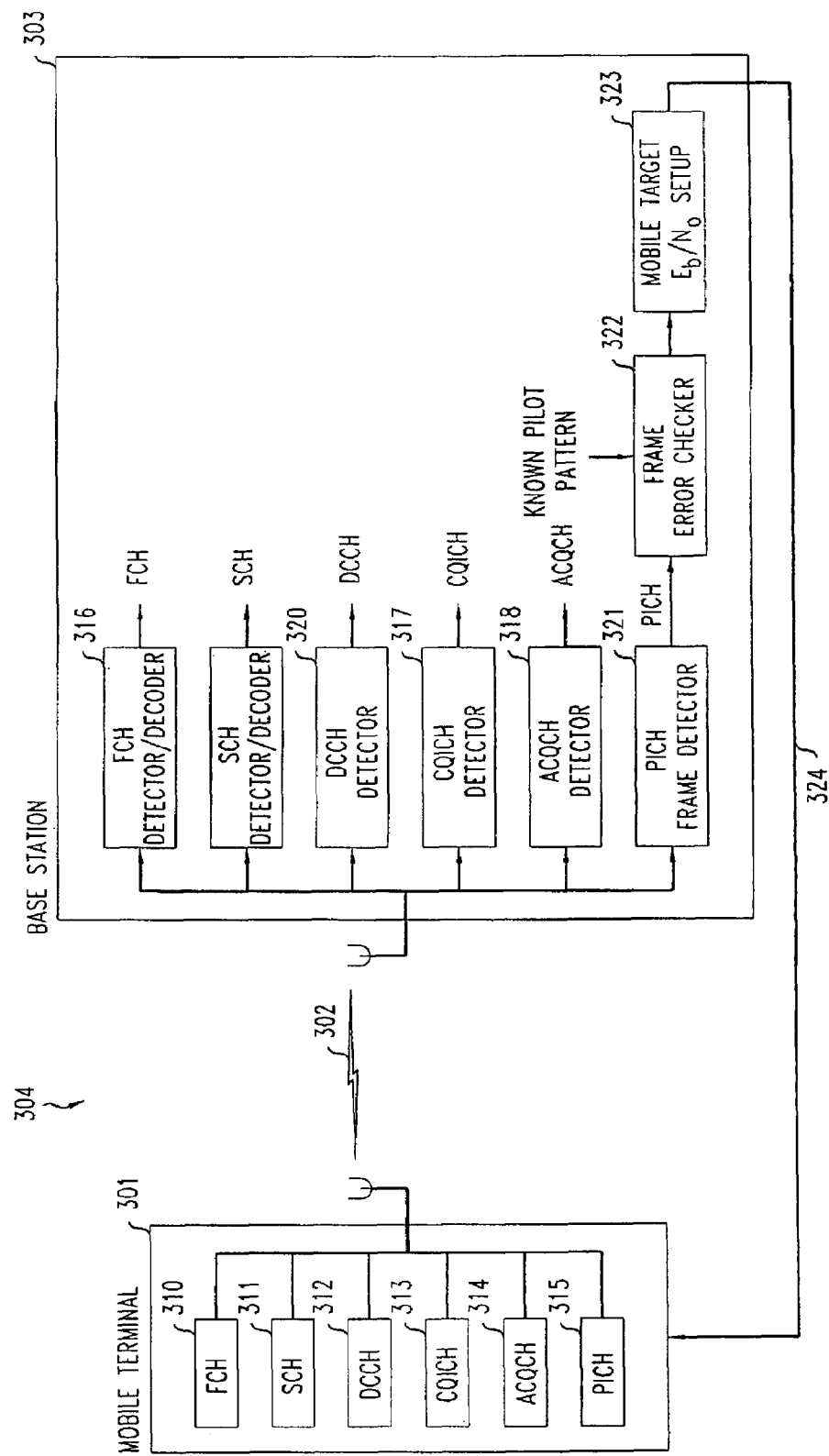
FIG. 3 is an embodiment of the present invention in which a frame error signal is derived directly from a received pilot signal itself, which is then used to derive a feedback signal for controlling the pilot $E_b/N_0$ in order to achieve a desire frame error rate on the FCH.

With reference to FIG. 3, a mobile terminal 301 communicates over propagation channel 302 with a base station 303 in a wireless communications system 304 operating in accordance with exemplary CDMA2000 standards. Although herein described in conjunction with a system operating under CDMA2000 standards, it should be understood that the present invention could be incorporated in any other type of CDMA system, for example, a UMTS system. At mobile terminal 301, pluralities of bit streams on individual channels are code division multiplexed using different Walsh codes for transmission to the base station 303. In a CDMA2000 system, these channels include a Fundamental Channel FCH 310 that carries encoded voice in a fixed frame format, a Supplemental Channel SCH 311 that carries packet data when the mobile terminal has such packet data to transmit, a Dedicated Control Channel DCCH 312 that carries control data, a Channel Quality Indicator Channel CQICH 313 on which a downlink received pilot strength is transmitted to the base station 303, an Acknowledgement Channel ACKCH 314 on which and indication of whether or not a received data packet on the downlink has been successfully decoded is transmitted to base station 303, and a Pilot Channel PICH 315 on which the mobile terminal pilot signal is transmitted and which is used for providing an amplitude and phase reference to the base station 303 for the detection of the FCH 310. After each of the code-division-multiplexed channels is separated at the base station 303, individual detectors and/or decoders recover each of the transmitted bit streams. For example, FCH detector/decoder 316 recovers the transmitted encoded voice channel frame-formatted bit stream when that channel is transmitting. Similarly, CQI detector 317 recovers the transmitted CQI and ACK detector 318 recovers the transmitted ACK. The SCH detector/decoder 319 recovers the packet data transmitted on the SCH channel, when that channel is being used for data transmission, and the DCCH detector 320 recovers the signal transmitted on the dedicated control channel.

As previously noted, the FCH and the SCH are discontinuous channels that cannot be used to derive a continuous frame error signal from frame-by-frame comparisons of sequentially received frames with the CRC within each frame. Thus, step up and step down signals cannot be derived from these either channel and transmitted to the mobile terminal 301 to control the mobile terminal $E_b/N_0$ pilot level as is done in the previously described prior art. Rather, in the embodiment of the present invention, the base station 303 instead monitors the continuously received pilot signal to determine whether the pilot signal has been received in error. A derived error signal is then transmitted by base station 303 back to the mobile terminal 301, which is informed to step up or step down its $E_b/N_0$ pilot level by predetermined fixed amounts so as to maintain a desired FER on the pilot signal. To develop such an error signal, a PICH frame detector 321 imposes a frame format consisting of a fixed number of bits per frame on the detected bit stream received on PICH 315. A frame checker 322 then compares the bit pattern of each frame with the known bit pattern of the pilot signal. For example, for the CDMA2000 system, the transmitted pilot signal consists of continuous "1's". Thus, by comparing the bit pattern in each pilot signal frame with the known and expected pilot bit pattern, an error signal can be developed. A mobile target $E_b/N_0$ setup device 323 then derives a step-up or step-down signal in response to each frame comparison, which is transmitted by the base station 303 on the downlink channel 324 to the mobile terminal 301.

For each comparison in which a pilot frame is determined to be in error, the base station 303 sends the mobile terminal a step up signal. The mobile terminal 303 in response thereto increases its $E_b/N_0$ pilot level by $(1-Y)\Delta$ dB. On the other hand, for each comparison in which a pilot frame is determined to be correct, the base station sends the mobile terminal a step down signal. The mobile terminal 303 in response thereto decreases its $E_b/N_0$ level by $Y\Delta$ dB.

This described methodology is effective if a frame error rate for the pilot frames of Y can always be achieved for $E_b/N_0$ values when a frame error rate for FCH frames of X is achieved, regardless of how and where the mobile terminal 301 and the base station 303 with which it is communicating are located relative to each other and regardless of over what type of propagation channel 302 they are communicating. Such a Y is found by selecting a pilot frame size that gives the desired result. Ideally, such a frame size would be one that, for the same $E_b/N_0$ level for all installation scenarios, gives the same frame error rate on the pilot channel as the desired frame error rate on the FCH, such as $10^{-2}$. Simulations over a wide range of simulated installations over all possible frame lengths showed that a frame size that gave such a result was not achievable. Rather, through multiple computer simulations, the inventors have determined that a frame size for the pilot signal could be found over all installation scenarios that gives a fixed pilot frame error rate for the same $E_b/N_0$ level that is associated with a desired FCH frame error rate.

Figure 4:
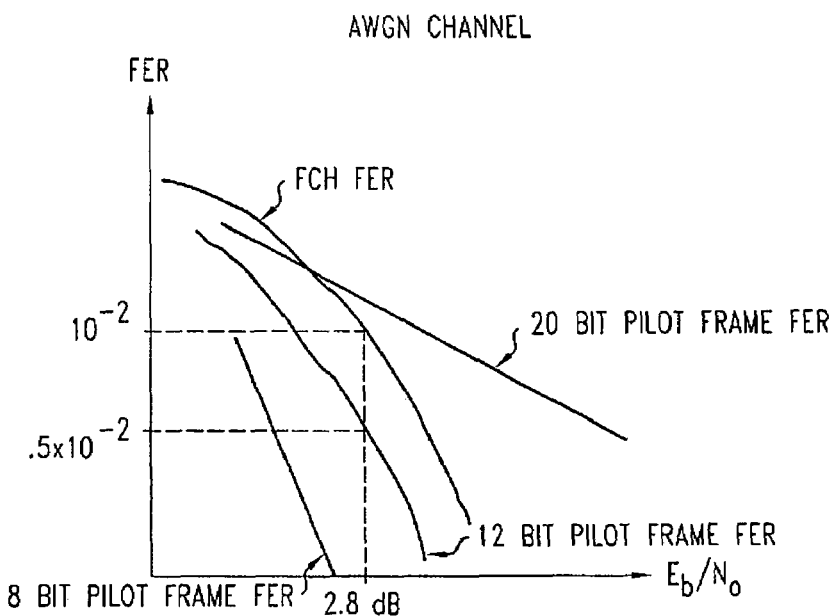
FIGS. 4 and 5 show the relationships between the pilot $E_b/N_0$ level and frame error rate for the FCH and for pilot frames of different frame lengths, in accordance with an embodiment of the present invention.
Figure 5:
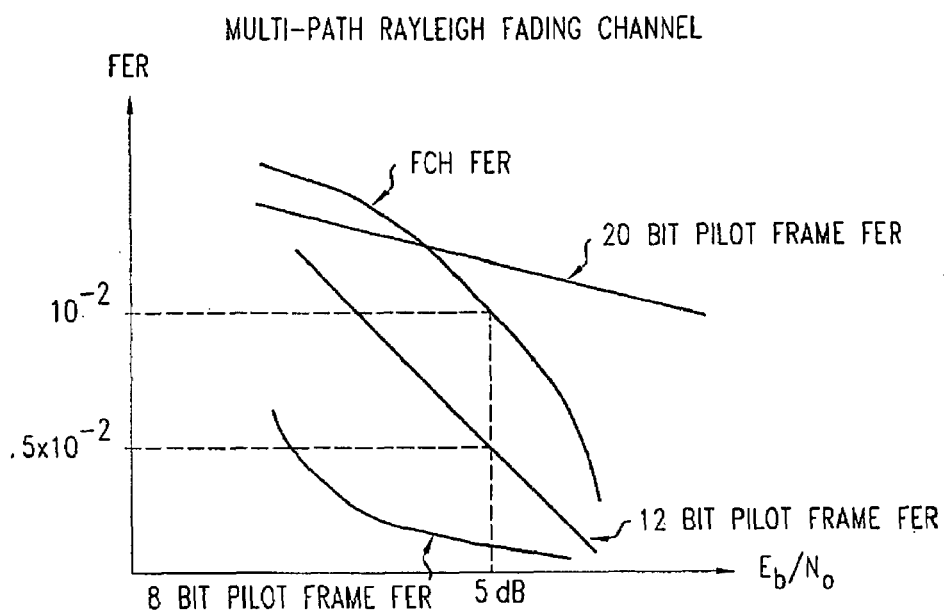

FIGS. 4 and 5 illustrate simulations for two different channel scenarios. FIG. 4 assumes an Additive White Gaussian Noise (AWGN) channel and FIG. 5 assumes a multi-path Rayleigh fading channel. Curve 401 in FIG. 4 shows frame error rate versus $E_b/N_0$ for the FCH on such an AWGN channel and curve 501 in FIG. 5 shows frame error rate versus $E_b/N_0$ on the multi-path Rayleigh fading channel. For an illustrative desired frame error rate of $10^{-2}$, the $E_b/N_0$ pilot level will be adjusted to approximately 2 dB when the mobile terminal and the base station are communicating over an AWGN channel, and to approximately 5 dB when the mobile terminal and the base station are communicating over a multi-path Rayleigh fading channel. Curves 402, 403 and 404 show the simulated pilot frame error rate versus $E_b/N_0$ for 8 bit, 12 bit and 20 bit pilot frames, respectively on the AWGN channel, and curves 502, 503 and 504 show the simulated pilot frame error rate versus $E_b/N_0$ for 8 bit, 12 bit and 20 bit pilot frames, respectively, on the multi-path Rayleigh fading channel. By comparing the pilot frame error rate versus $E_b/N_0$ curves for each frame length in FIGS. 4 and 5, it can be observed that for a FCH frame error rate of $10^{-2}$ only a pilot frame length of approximately 12 bits yields a pilot frame error rate that is equal in both figures at the $E_b/N_0$ level in each that is associated with that FCH frame error rate. Illustratively, for a 12 bit frame, a pilot frame error rate of $0.5 \times 10^{-2}$ is equivalent to the FCH frame error rate of $10^{-2}$ for both scenarios. These same results are also achieved in other computer simulations over a wide variety of installation scenarios. Therefore, for a desired frame error rate of $10^{-2}$ on the FCH, a 12 bit pilot frame is used and the frame error signal generated there from is used to set and maintain the $E_b/N_0$ pilot level of the mobile terminal at a value that yields a $0.5 \times 10^{-2}$ frame error rate on that pilot channel. By so maintaining the pilot $E_b/N_0$ level, the frame error rate of the FCH when an encoded voice signal is transmitted on it will be maintained at the desired $10^{-2}$, and the levels of the FCH, the SCH and the other channels, which power levels are individually controlled relative to the pilot $E_b/N_0$ level, will be maintained at their proper transmit levels.

Although the error signal derived at the base station from the pilot signal is used in the embodiment described above to control the mobile terminal's $E_b/N_0$ pilot level, the error signal can also be used by the base station directly as a measure of uplink signal quality and can be a factor used to determine whether communication between the base station and the mobile terminal should continue or should be discontinued. That error signal can take different forms and can indicate a degree of mismatch between the framed pilot with the known pilot portion.

While the particular invention has been described with reference to the illustrative embodiment, this description should not be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Further, the invention may be implemented in different locations, such as at a base station, a base station controller and/or mobile switching center, or elsewhere depending upon in what type of system the invention is employed. Moreover, processing circuitry required to implement and use the described invention may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method, comprising the steps of:
   receiving a digital pilot signal;
   framing the pilot signal into sequential frames each of a predetermined length from the received pilot signal, data in each frame consisting of only pilot signal bits, wherein the predetermined length of the frames of the framed pilot signal is chosen so that a predetermined frame error rate of the sequential frames of the received pilot signal is associated with a constant predetermined frame error rate of a received fundamental channel;
   comparing at least one frame with a known frame pattern of the pilot signal;
   developing an error signal from the comparison step, wherein the error signal is fed back to control transmission power of the pilot signal.

2. The method of claim 1 wherein the error signal comprises a step-up signal that is transmitted to increase an $E_b/N_0$ power level of the pilot signal when the comparison step indicates that the at least one frame is different than the known pilot frame pattern, and a step-down signal that is transmitted to decrease the $E_b/N_0$ power level of the pilot signal when the comparison step indicates that the at least one frame is the same as the known pilot frame pattern.

3. The method of claim 2 wherein the step up and step down signals are transmitted to increase and decrease the $E_b/N_0$ power level of the pilot signal so as to maintain a predetermined frame error rate on the sequential frames of the received pilot signal.

4. The method of claim 1 wherein the error signal indicates a degree of mismatch between the framed pilot signal and the known pilot pattern and represents a measure of an uplink signal quality.

5. The method of claim 3 wherein the magnitude of the error signal is used to determine whether communication should continue or should be discontinued.

* * * * *